UNITED STATES PATENT OFFICE.

JAMES RUSSELL MOYLE, OF JACKSONVILLE, FLORIDA.

AIR-BAG RENEWER.

1,409,397. Specification of Letters Patent. Patented Mar. 14, 1922.

No Drawing. Application filed September 4, 1920. Serial No. 408,272.

*To all whom it may concern:*

Be it known that I, JAMES R. MOYLE, a citizen of the United States, residing at Jacksonville, in the county of Duval and State of Florida, have invented certain new and useful Air-Bag Renewers, of which the following is a specification.

In the manufacturing and repairing of automobile tires and similar rubber articles, the inside form of the product is obtained by means of an inflated rubber core, known to the trade as an "air bag." Since it is with the repair of this "air bag" that this invention has to deal, future reference to the same will be made by simply naming the object unquoted.

The object of my invention is to provide a composition of matter which may be employed in repairing porous or punctured air bags.

The air bag which is placed within the tire during the curing, and vulcanizing process must necessarily be subjected to intense heat and therefore is soon rendered porous and is then useless.

I have found, through careful and diligent search, that this enormous loss can be eliminated by the use of the following composition of matter:

Uncured rubber clippings _____ 4 oz.
Benzine _____ 6 gills
Methyl alcohol _____ 1 gill
Sulphur _____ 1 oz.

The rubber clippings are mixed with the benzine and stirred well, after which the wood alcohol is added. This is stirred until a thick rubber syrup is obtained and the sulphur is then added. After standing for about 15 minutes, the whole is strained through a wire screen of about 60 mesh.

The application of the above composition of matter is made by injecting a suitable amount of the liquid inside the air bag by means of a grease gun or ordinary pump. The air bag is then rotated to insure a uniform coating on the inner surface. The valve core, which must be removed when injecting the liquid is then replaced, and the bag is inflated. The air bag is then placed as a core, in the usual manner, and subjected to the heat of the vulcanizing process. After the tire has been cured, the air bag is removed and the air allowed violently to exhaust itself, by removing the valve. This process blows impurities out of the air bag in the form of a fine dust, and after reinserting the valve, the bag will be found to be no longer porous.

The benzine is used to soften the crude rubber, while I have found that the alcohol brings the composition quickly into a syrupy state. The sulphur is employed as the usual vulcanizing agent and is not effective until the heat is applied. This composition will remain in a well stoppered bottle indefinitely, and can be prepared in any quantity deemed necessary without fear of hardening. When heat is applied the volatile solvents are rapidly evaporated and only the crude rubber together with sufficient sulphur remains within the bag.

This composition does not injure rubber; but on the other hand it has been found to add strength and durability to the air bags.

Having thus fully described my invention, I claim:

A composition for the repair of rubber articles comprising uncured rubber, 4 oz., benzine 6 gills, methyl alcohol 1 gill, sulphur 1 oz.

JAMES RUSSELL MOYLE.